United States Patent
Fleming et al.

(10) Patent No.: US 12,349,840 B2
(45) Date of Patent: Jul. 8, 2025

(54) IN-CONTAINER INDUCTIVE HEATING FOR A BLENDER

(71) Applicant: VITA-MIX MANAGEMENT CORPORATION, Olmsted Township, OH (US)

(72) Inventors: Mark Fleming, Olmsted Township, OH (US); Saifur Tareen, Wadsworth, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 982 days.

(21) Appl. No.: 17/285,668

(22) PCT Filed: Oct. 15, 2019

(86) PCT No.: PCT/US2019/056256
§ 371 (c)(1),
(2) Date: Apr. 15, 2021

(87) PCT Pub. No.: WO2020/081521
PCT Pub. Date: Apr. 23, 2020

(65) Prior Publication Data
US 2021/0315421 A1    Oct. 14, 2021

Related U.S. Application Data

(60) Provisional application No. 62/745,543, filed on Oct. 15, 2018, provisional application No. 62/779,852, filed on Dec. 14, 2018.

(51) Int. Cl.
*H05B 6/10* (2006.01)
*A47J 27/00* (2006.01)
(Continued)

(52) U.S. Cl.
CPC ......... *A47J 43/0716* (2013.01); *A47J 27/004* (2013.01); *A47J 36/321* (2018.08);
(Continued)

(58) Field of Classification Search
CPC ...................................... H05B 6/109
(Continued)

(56) References Cited

U.S. PATENT DOCUMENTS

| | | | |
|---|---|---|---|
| 1,008,622 A * | 11/1911 | Thomson | H05B 6/108 219/687 |
| 2,585,255 A | 2/1952 | Kocner et al. | |

(Continued)

FOREIGN PATENT DOCUMENTS

| | | |
|---|---|---|
| CN | 106580134 A | 10/2015 |
| GB | 2572937 A1 | 10/2019 |
| WO | 2015106762 A1 | 7/2015 |

OTHER PUBLICATIONS

International Search Report and Written Opinion mailed Jan. 13, 2020; International Application No. PCT/US2019/056256 filed on Oct. 15, 2019. ISA/US.

*Primary Examiner* — David L Sorkin
(74) *Attorney, Agent, or Firm* — Dinsmore & Shohl LLP

(57) ABSTRACT

A blending system includes a container or housing, a blade assembly, and an insert are described herein. The insert is
(Continued)

disposed in or on the container or housing. The blade assembly includes a drive shaft. The drive shaft is rotatable. A magnet is attached to the drive shaft. Rotation of the magnet induces current in the insert. The current induces heat.

22 Claims, 6 Drawing Sheets

(51) Int. Cl.
  *A47J 36/32*   (2006.01)
  *A47J 43/046*  (2006.01)
  *A47J 43/07*   (2006.01)
  *A47J 43/08*   (2006.01)
  *H05B 6/12*    (2006.01)

(52) U.S. Cl.
  CPC ......... *A47J 43/0465* (2013.01); *A47J 43/085* (2013.01); *H05B 6/10* (2013.01); *H05B 6/108* (2013.01); *H05B 6/109* (2013.01); *H05B 6/12* (2013.01); *A47J 2202/00* (2013.01)

(58) Field of Classification Search
  USPC .................................. 219/631; 366/144–146
  See application file for complete search history.

(56) References Cited

U.S. PATENT DOCUMENTS

| | | | |
|---|---|---|---|
| 2,912,552 A | | 11/1959 | Baermann |
| 3,085,142 A | | 4/1963 | Baermann |
| 3,294,946 A | * | 12/1966 | Baermann ............... F24V 99/00 |
| | | | 219/652 |
| 3,742,178 A | * | 6/1973 | Harnden, Jr. ......... A47J 36/321 |
| | | | 220/573.1 |
| 3,742,179 A | | 6/1973 | Harnden |
| 4,600,821 A | * | 7/1986 | Fichtner ................. H05B 6/109 |
| | | | 219/631 |
| 4,678,881 A | * | 7/1987 | Griffith .................... B01F 27/13 |
| | | | 219/631 |
| 5,012,060 A | | 4/1991 | Gerard et al. |
| 2002/0141285 A1 | | 10/2002 | Williams et al. |
| 2010/0326284 A1 | * | 12/2010 | Volz ....................... A47J 27/004 |
| | | | 99/323.1 |
| 2017/0071413 A1 | * | 3/2017 | Park ....................... A47J 27/004 |

* cited by examiner

IN-CONTAINER INDUCTIVE HEATING FOR A BLENDER

RELATED APPLICATIONS

This application is a 35 U.S.C. 371 national stage filing of PCT Application No. PCT/US2019/056256 filed on Oct. 15, 2019, and entitled "IN-CONTAINER INDUCTIVE HEATING FOR A BLENDER," which claims the benefit of U.S. Provisional Patent Application Ser. No. 62/745,543 filed Oct. 15, 2018 and entitled "In-Container Inductive Heating" and U.S. Provisional Patent Application Ser. No. 62/779,852 filed on Dec. 14, 2018 entitled "In-Container Inductive Heating for A Blender", the entireties of which are incorporated herein by reference.

TECHNICAL FIELD

The present teachings relate to a blending system and method, and more particularly, to an in-container inductive heating device for a blender that imparts heat into foodstuff.

BACKGROUND

Blending systems are often used to blend and process foodstuffs. Conventional blenders generally include a base with a motor and a mixing container with an operable mixing blade disposed therein. A blender lid is adapted to cover the mixing container. A user inserts contents within the mixing container to be mixed by the rotation of the blade. The container is positioned on the base as a user controls the operation of the motor within the base to rotate the mixing blade within the container to mix the contents therein.

It may be desirable to impart heat into foodstuff during mixing. For instance, a user may wish to make a soup or other product with the blender. In some traditional systems, the blender blades create friction that can impart heat into foodstuff. These systems may be used to make hot beverages through friction between moving food particles and/or with mixing blades to warm up the beverage. The friction can take time to generate sufficient heat and to bring the foodstuff to a desired temperature. This can be a long process as the ratio between amount of heat produced by friction and the volume of fluid is not always very high.

Therefore, a need exists for improved blending systems. For instance, there is a need for a blending system that can more efficiently impart heat and that may reduce overall preparation time.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Described is a blending system comprising a base comprising a motor, a container comprising a body, a blade assembly operatively attached to the container, the blade assembly comprising a drive shaft that is operatively driven by the motor, and an insert disposed on or within the container, wherein rotation of the drive shaft operatively induces current within the insert. The blade assembly further comprises at least one blade, and wherein the blade is magnetized. In another example, the blade assembly further comprises at least one magnet operatively attached to the drive shaft capable of inducing heat via rotation of the drive shaft.

Additionally described is a blending system comprising a base comprising a motor, a container comprising a body, a blade assembly operatively attached to the container, the blade assembly comprising a drive shaft that is operatively driven by the motor, and an insert disposed on or within the container, wherein rotation of the drive shaft operatively induces heat in the container.

The following description and the drawings disclose various illustrative aspects. Some improvements and novel aspects may be expressly identified, while others may be apparent from the description and drawings.

DESCRIPTION OF THE DRAWINGS

The present teachings may be better understood by reference to the following detailed description taken in connection with the following illustrations, wherein.

Figure 1:
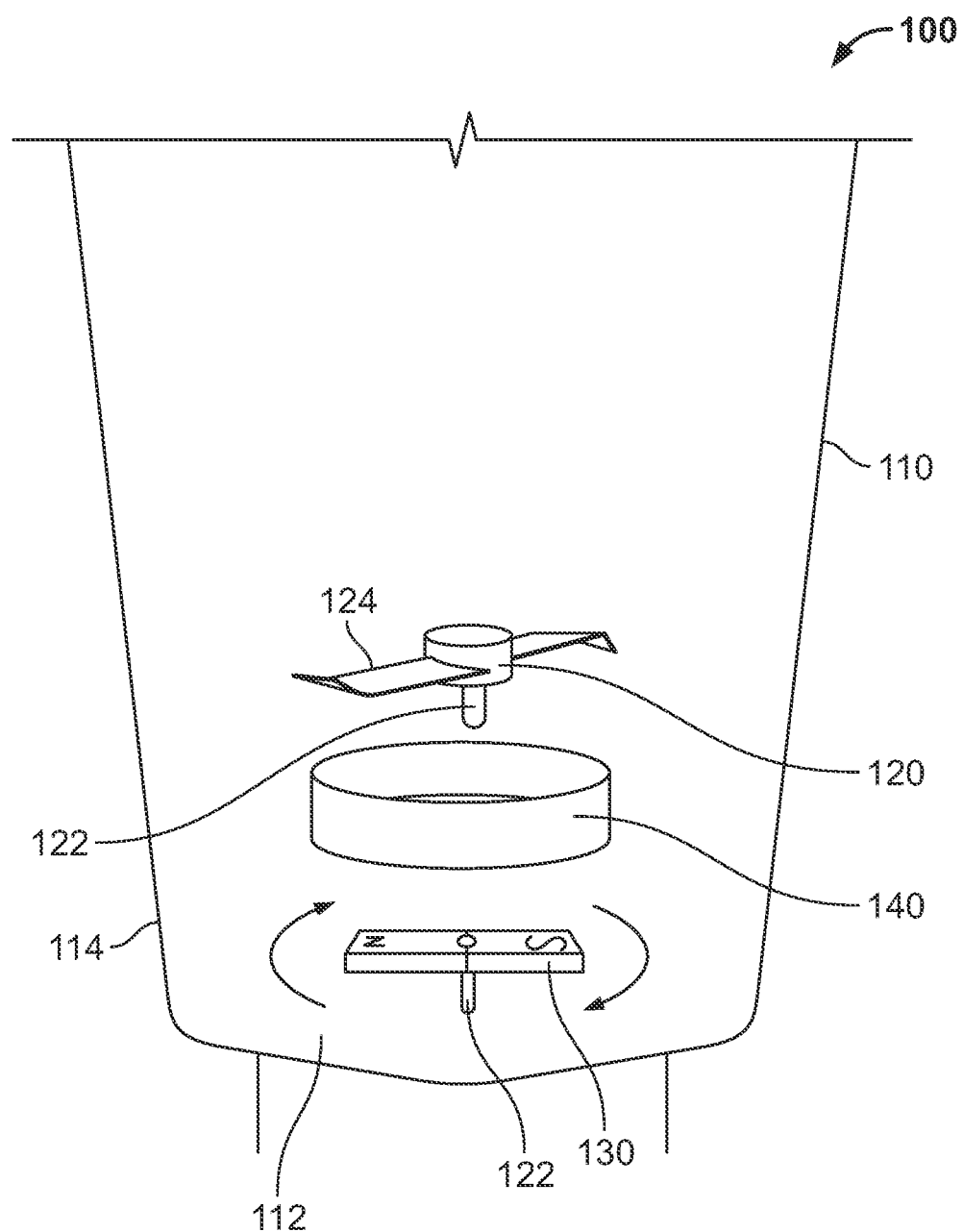
FIG. 1 is an exploded view of a blending system including a magnet and an insert in accordance with various disclosed aspects.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

It is noted that references to a blender, blending system, and the like, are understood to include food processor systems, and other mixing systems. Such systems generally include a blender base that may include a motor, a blade assembly, and a controller. Further, such systems may include a container, a display, a memory and/or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Furthermore, while blending of "ingredients," "contents," or "foodstuffs" is described by various embodiments, it is noted that non-food stuff may be mixed or blended, such as paints, epoxies, construction material (e.g., mortar, cement, etc.), and the like. Moreover, blending of ingredients may result in a blended product. Such blended products may include drinks, frozen drinks, smoothies, shakes, soups, purees, sorbets, butter (nut), dips, or the like. Accordingly, such terms may be used interchangeably unless context suggests otherwise or warrants a particular distinction among such terms. Further, such terms are not intended to limit possible blended products and should be viewed as examples of possible blended products.

In embodiments, the blending systems may include any household blender and/or any type of commercial blending system, including those with covers that may encapsulate or partially encapsulate the blender as well as those that may be handheld and inserted into foodstuff by a user. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser), or any other combination of such.

As used herein, the phrases "blending process," "blending program," and the like are used interchangeably unless context suggests otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

The terms "identification tag," "chip," "NFC component," and the like may be used interchangeably, unless context suggests otherwise or warrants a particular distinction among such terms. Such may refer to an NFC component or tag, which may be capable of sending/receiving a signal. It is noted that embodiments may utilize other radio frequency identification (RFID) devices, transponders, or tags. Accordingly, embodiments reference NFC for brevity, but such embodiments may utilize other RFID devices, methods, or systems. It is further noted that RFID tags may be chosen based on a frequency (e.g., low frequency RFID tags for close communication). Identification tags may comprise printable RFID tags, NFC tags, tags including microchips, or the like. Identification tags can contain stored information, such as in a memory (e.g., read-only memory (ROM), random access memory (RAM), electrically erasable programmable read-only memory (EEPROM), or various other types of memory). In another aspect, an identification tag may be powered by electromagnetic induction from magnetic fields produced by a reader. For instance, an identification tag may include an NFC component that uses induction between two loop antennae located within the container's near field, effectively forming an air-core transformer. The antennae may comprise various materials, such as copper. While an air-core transformer is described, various other antennae formations may be utilized.

In an example, an NFC component may include an NFC tag and an NFC emitter. The NFC tag and NFC emitter may each include one or more antennae. For instance, the NFC tag may include a loop antenna and the NFC emitter may include another loop antenna. It is noted that the loop antennae may or may not be substantially similar to each other. The NFC tag antenna and NFC emitter antenna may be operatively coupled via an electromagnetic field. The coupling may form or represent an air-core coil or transformer. The NFC emitter may generate an alternating current that may be received by the NFC emitter antenna. The current may induce an electromagnetic field through the air or another carrier medium. The electromagnetic field may induce a current in the NFC tag antenna. The received current may provide power to various components of the NFC tag.

In various embodiments, an NFC tag may include the antenna (e.g., inlay), a processor, and a memory device. The memory device may include various types of memory, such as electrically erasable programmable read-only memory (EEPROM) and the like. When the NFC tag is powered (e.g., current induced by the electromagnetic field), the NFC tag may generate a response that may be received by the NFC emitter.

As described herein, the identification tag may be a passive transponder that collects energy from interrogating radio waves and/or may include a local power source such as a battery. As such, an identification tag and a reader may be configured as a passive reader active tag (PRAT) system, active reader passive tag (ARPT) system, an active reader active tag (ARAT) system, or the like.

In another aspect, an identification tag may power various components or devices. For example, an NFC component may power a digital display and/or interface of a container. In embodiments, the identification tag may be configured to operate and/or communicate with a reader when within a threshold distance. For instance, an identification tag may communicate with a reader when the identification tag is less than or equal to j units from the reader, where j is a number and the unit is a unit of distance. In an example, the identification tag may operate when it is less than or about six centimeters from the reader, when it is less than or about one meter from the reader, etc.

In some traditional systems, heating elements are added to a base of an appliance. The heating element transfers heat to a container. The heat then transfers from the container to the food products. Other traditional systems use devices to heat the outside of the container. The heat then transfers through the container and into the foodstuff. Still other systems use heating elements that are separate from the container. These heating elements are subject to wide variations depending on where a user places the heating elements or how a product is mixed. Some other traditional blender systems use resistance plates to heat up the base of the blender. Convection is then used to transfer the heat to the blending container, and then through the blending container to the food. This heat transfer is inefficient and limited due to available current from power sources.

Disclosed herein are blending systems and methods that provide direct heat to food product through an in-container or in-housing heating element. For example, a blender container may comprise a blade assembly, a container body, and an insert. In another example, a blending system may comprise a housing and blending portion that is operatively disposed within a container by a user. The blade assembly may be removably coupled to the container body or blending portion. The blade assembly may comprise a drive shaft and blades. In at least one example, the insert is positioned within or on the blender body. In another example, the insert may be attached to the drive shaft. The insert may act as a magnet or an exciter for inducing heat in an inductive system. In some embodiments, a plurality of inserts may be utilized as magnets or exciters. This may allow heat to be generated directly within the flow of foodstuff in the blending container. Moreover, embodiments may impart heat without requiring additional power during a blending process.

Embodiments expedite the heating process of foodstuff during blending. For example, embodiments utilize the concept of inductive heating where a changing magnetic field induces Eddy Currents in a magnetically-conducting metal tube that is submerged in foodstuff or disposed within the container. This current heats up the tube which then transfers heat into the contents of the container, helping to raise its temperature rapidly. The direction of the current flow is perpendicular to the plane in which the magnets are rotating with the magnets rotating concentric to the metal tube and close to its inner surface. The magnitude of the Eddy Current generated may be a function of the rate of change of magnetic flux through the material, the strength of the magnetic field, the thickness of the material, which should be greater than the "skin effect," and the magnetic reluctance of the material.

The embodiments below describe, but are not limited to, a blending system comprising a container; a blade assembly operatively attached to the container, the blade assembly comprising a drive shaft that is operatively driven by the motor; and an insert disposed within the container, wherein rotation of the drive shaft operatively induces current within the insert. The blade assembly may further comprise at least one blade, wherein the blade is magnetized. The blade assembly may further comprise at least one magnet operatively attached to the drive shaft. The blending system may further comprise at least one wireless communication device. The insert may be hermetically sealed. The container may further comprise a clutch capable of selectively coupling the insert to the drive shaft. The blending system may further comprise a base comprising a motor. The blending system may further comprise at least one sensor. The at least one sensor may be a temperature sensor.

In another embodiment, the blending system comprises a container; a blade assembly operatively attached to the container, the blade assembly comprising a drive shaft that is operatively driven by the motor; and an insert disposed within the container, wherein rotation of the drive shaft relative to the insert operatively induces heat in the container. The insert may be magnetized. Further:
  a. the blade assembly further comprises at least one blade, and wherein the blade is magnetized;
  b. The blending system may comprise at least one wireless communication device;
  c. the insert may be hermetically sealed;
  d. The blending system of further comprises a base comprising a motor;
  e. The blending system further comprises at least one sensor;
  f. The at least one sensor is a temperature sensor; and
  g. The container further comprises a clutch capable of selectively coupling the insert to the drive shaft.

In another embodiment, the blending system may comprise: a housing including a blending portion, a shaft, and a motor; a blade assembly operatively attached to the blending portion, the blade assembly comprising a drive shaft that is operatively driven by the motor; and a magnet disposed within the blending portion, wherein rotation of the drive shaft operatively induces heat. Further:
  a. The blending system includes a container, wherein the blending system operatively induces heat in the container;
  b. The blending system is handheld;
  c. The blending system further comprises at least one wireless communication device;
  d. The housing further comprises a clutch capable of selectively coupling the magnet to the drive shaft;
  e. The blending system further comprising at least one sensor; and
  f. The blending system wherein the at least one sensor is a temperature sensor.

Turning to FIG. 1, shown is a functional exploded view of a blending system 100 that may comprise an in-container heating system in accordance with various disclosed aspects. The blending system 100 may include a container 110 that may include a lid (not shown), a blade assembly 120, a magnet 130, and an exciter 140. As described herein, the container 110 may be selectively attached to a blender base to blend foodstuff.

The magnet 130 may be operatively attached to a drive shaft 122 of the blade assembly 120. In an example, the magnet 130 may be disposed on the drive shaft 122 in between blades 124 and a container bottom 112. The magnet 130 may be of any appropriate configuration or type. The present disclosure is not limited to a specific configuration of magnet—any type of magnet may be utilized. For example, the magnet 130 may comprise a permanent magnet being neodymium iron boron (NdFeB) magnet, samarium cobalt (SmCo) magnet, alnico magnet, ceramic or ferrite magnet, a temporary magnet, an electromagnet or any combination of the foregoing. In the embodiment shown, the magnet 130 comprises an electromagnet. A motor (not shown) of the blender base may operatively drive the drive shaft 122 to rotate the blades 124 and the magnet 130. Rotation of the magnet 130 may cause negative and positive poles of the magnet 130 to rotate. The magnet 130 may be generally disposed within an inner perimeter of the exciter 140. The exciter 140 may comprise a metal insert that may be cylindrical, such as a steel tube. It is noted, however, that the exciter 140 may comprise other shapes, including, without limitation, rectangular, square, oval, cylindrical, conical or any combination of the foregoing. The rotation of the magnet poles within the inner perimeter of the exciter 140 may induce heat within the exciter 140, which may impart heat into the foodstuff.

The heat generated through the inductive heating may be used to heat or cook soups, nut milks, baby food, or the like. In some instances, the inductive heat may be used to reduce blend time, improve efficiency, increase blend consistency, or the like. Moreover, blending system 100 may be utilized to boil water, steam food, or the like. In at least one example, the blending system 100 may utilize a steaming basket such as describe in U.S. provisional patent Ser. No. 16/166,525, entitled AUXILIARY PROCESSING DEVICE FOR APPLIANCE, the entirety of which is incorporated by reference herein.

According to an embodiment, the magnet 130 may be disposed on the blades 124 or may be displaced from the blades 124. In another embodiment, the blades 124 may be magnetized such that the magnet 130 may not be included in the blending system 100. As such, rotation of the blades 124 induces the exciter 140 to generate heat.

It is further noted that the exciter 140 may be disposed within a body 114 of the container 110, at a bottom 112 of the container, may extend from the bottom 112, or may be otherwise positioned on or within the container 110. The exciter 140 may be hermetically sealed on or within the container 110 to prevent contamination, for ease of cleaning the container 110, and/or to improve fluid dynamics during a blending process. In at least one example, the exciter 140 may be overmolded within the body 114.

Figure 2:
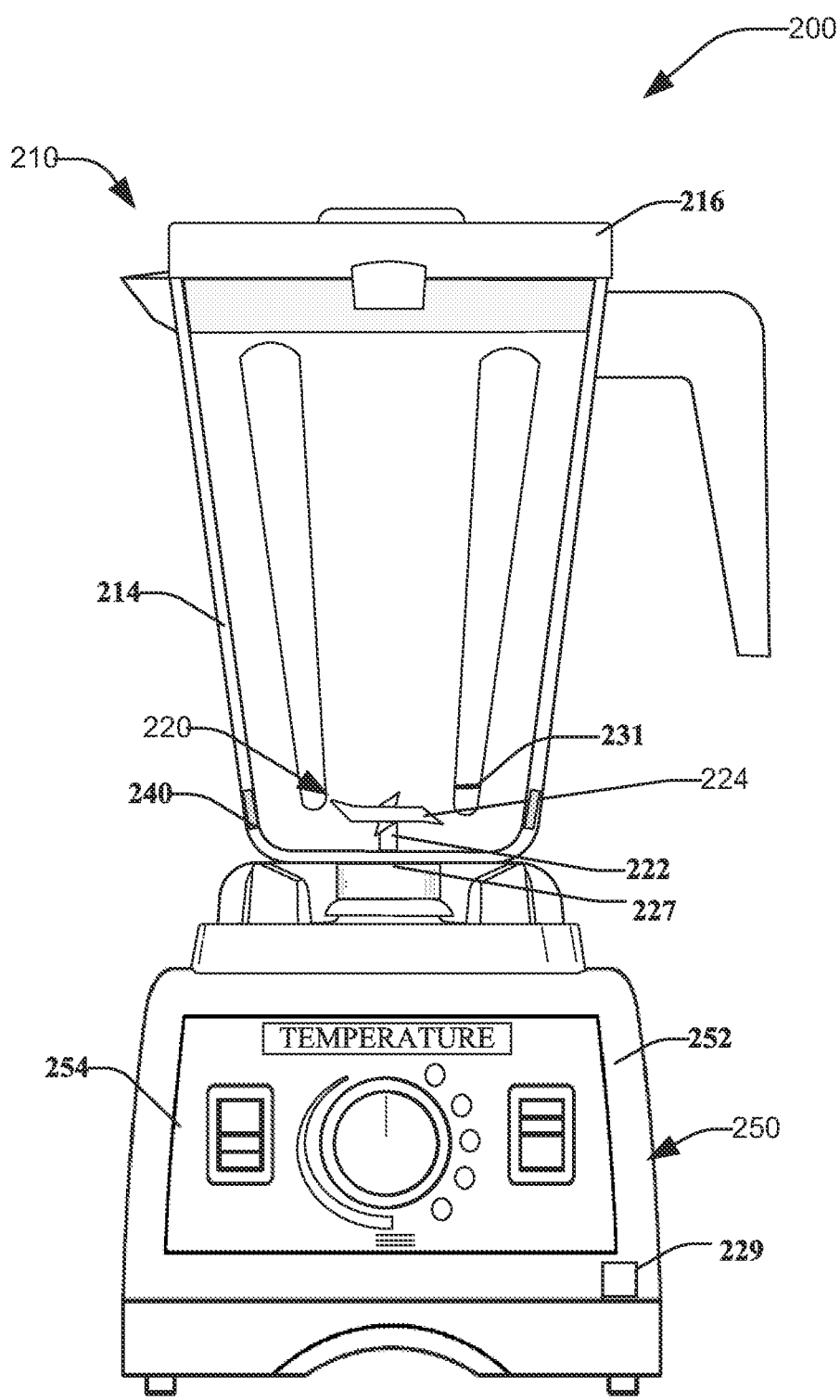
FIG. 2 is a side view of a blending system including a base and a partial cross-sectional view of a container in accordance with various disclosed aspects.

Turning to FIG. 2, there is a blending system 200 that may inductively heat foodstuff in accordance with disclosed aspects. Blending system 200 may primarily comprise a container 210, a blade assembly 220, an insert 240, and a blender base 250. The blender base 250 may comprise a motor that may be disposed within a housing 252. In another aspect, the base 250 may include a user interface 254 that may allow a user to select a program, control the motor, and/or view information, such as a temperature within the container or time left during a blending process.

Container 210 may be selectively and operatively attached to the blender base 250. The container 210 may comprise a body 214 and a lid 216. A blade assembly 220 may be operatively attached to the container 210. In another aspect, an insert 240 may be disposed within or on the body 214 of the container 210. For instance, the insert 240 may be overmolded within the container body 214. It is noted that the insert 240 may be disposed in other locations and may be disposed generally close to blades 224 of the blade assembly 220 such that current may be more efficiently induced and heat may be generated.

The blade assembly 220 may comprise a drive shaft 222 that is operatively connected to a drive shaft of the motor. The drive shaft 222 may drive the blade assembly 220 to blend foodstuff. The blades 224 and the insert 240 may interact to inductively heat foodstuff within the container 210. In an example, one of the blades 224 and the insert 240 may be magnetized while the other acts as an exciter for inducing heat. For instance, the blades 224 may be magnetized such that rotation of the blades 224 changes the magnetic flux induced within the insert 240 during rotation of the blades 224. In another example, the insert 240 may be magnetized such that rotation of the blades 224 causes magnetic flux and inductive heating. The direction of the current flow is generally perpendicular to the plane in which the magnets are rotating with the magnets rotating concentric to the exciter, which may be a metal tube. The magnitude of the current generated may be a function of the rate of change of magnetic flux through the material, the strength of the magnetic field, the thickness of the material, which should be greater than the "skin effect," and the magnetic reluctance of the material.

It is noted that the blending system 200 may include wireless communication devices, such as BLUETOOTH devices, NFC devices, or other RFID devices. For instance, the container 210 may include a wireless tag 227 that may identify the make and model of the container 210. The blender base 250 may include a wireless device 229 operatively in communication with the container 210 to, for example, identify the container 210 or identify a blending program for the container 210. In one example, the blender base 250 may identify the container 210 as comprising built-in elements capable of producing heat. The blender base 250 may operatively select one or more blending programs associated with the container 210 that account for the container 210 having such built-in elements capable of producing heat, which includes the elements identified above. The blending programs may be presented to the user via the interface 254 and the user may select one of the blending programs to be executed by the blender base 250.

In some embodiments, a user may identify or the base 250 may determine a type of food to be processed by the blender system 200 via the user interface 254, a sensor, or a user device such as a smart phone, wearable, laptop, smart scale, or the like. Likewise, the blending system 200 may detect a type of food based on one or more sensors, such as a camera, electronic nose, or the like. The blender base 200 may receive the type of food and adjust or select a blending pattern. As such, it is noted that the blending system 200 may comprise other or additional components. For instance, the blending system 200 may comprise an intelligent blending system that may include cameras, optical scanning devices, optical scanners, spectrometer, multi-wave length scanner, electronic noses, or the like. The blending system 200 may include what is described in PCT Application No. PCT/US2017/059497, the entirety of which is incorporated by reference herein.

According to at least one embodiment, the blending system 200 may comprise one or more sensors disposed within or on the blending container 210, the blade assembly 220, the insert 240, or the like. The sensors may include, without limitation, any number of thermal sensors 231 (one, two, three, four, etc.), which may be positioned on the blending container 210. The thermal sensors 231 may include a wireless communication device coupled to a thermal measuring device. The thermal sensors 231 may measure the temperature within the container and may communicate the temperature to the blender base 250. It is noted that the sensors may communicate contact-free, wirelessly, or via a physical connection.

In at least some embodiments, the blender base 250 may execute a blending program that may be based at least partially on a temperature of foodstuff. For instance, the blender base 250 may execute a series of instructions to alter motor parameters. The blender base 250 may ramp up to a first speed and may continue to blend at the first speed until a desired temperature is reached—such as may be identified by the thermal sensor(s) 231. The blender base 250 may then terminate blending or may alter the motor parameters to a second speed. It is noted that various blending patterns may be utilized.

Figure 3A:
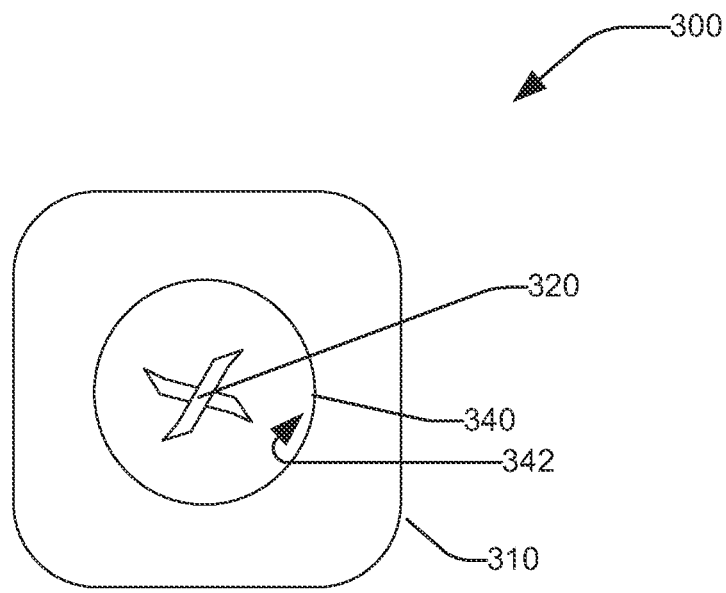
FIG. 3A is a top plan view of a container comprising an insert and blade assembly in accordance with various disclosed aspects.
Figure 3B:
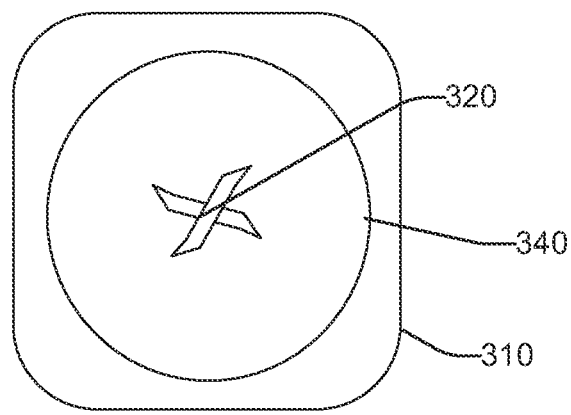
FIG. 3B is a top plan view of the container of FIG. 3A comprising the insert and the blade assembly where the blade assembly is relatively further from the insert than shown in FIG. 3A in accordance with various disclosed aspects.

Turning to FIGS. 3A-3B, there illustrated is a blending container 310 operatively attached to a blade assembly 320, and comprising an insert 340. It is noted that the blending container 310, blade assembly 320, and the insert 340 may comprise similar aspects as described with reference to the other figures. FIG. 3A shows an embodiment where the blade assembly 320 is closer to an inner perimeter 342 of the insert 340, and FIG. 3B shows an embodiment where the blade assembly 320 is further away from the inner perimeter 342 of the insert 340. The distance between the blade assembly 320 and the inner perimeter 342 alters the amount of current induced. Additionally, the positioning and size of the insert 340 may alter the fluid dynamics within the container 310 during a blending process. For some foodstuff, positioning the blade assembly 320 and the insert 340 too close to each other may result in foodstuff being trapped between the blade assembly 320 and the insert 340, inefficient blends, or the like. In contrast, the further away the blade assembly 320 is from the inner perimeter 342, the less current generated and longer the heating time. It is noted that the positioning and sizing of the insert 340 may be dependent on the foodstuff to be processed. For instance, a first embodiment may be made for liquid beverages where the blade assembly 320 is relatively close to the inner perimeter 342. A second embodiment may be made for soups where the blade assembly 320 is relatively further away from the inner perimeter 342.

Figure 5:
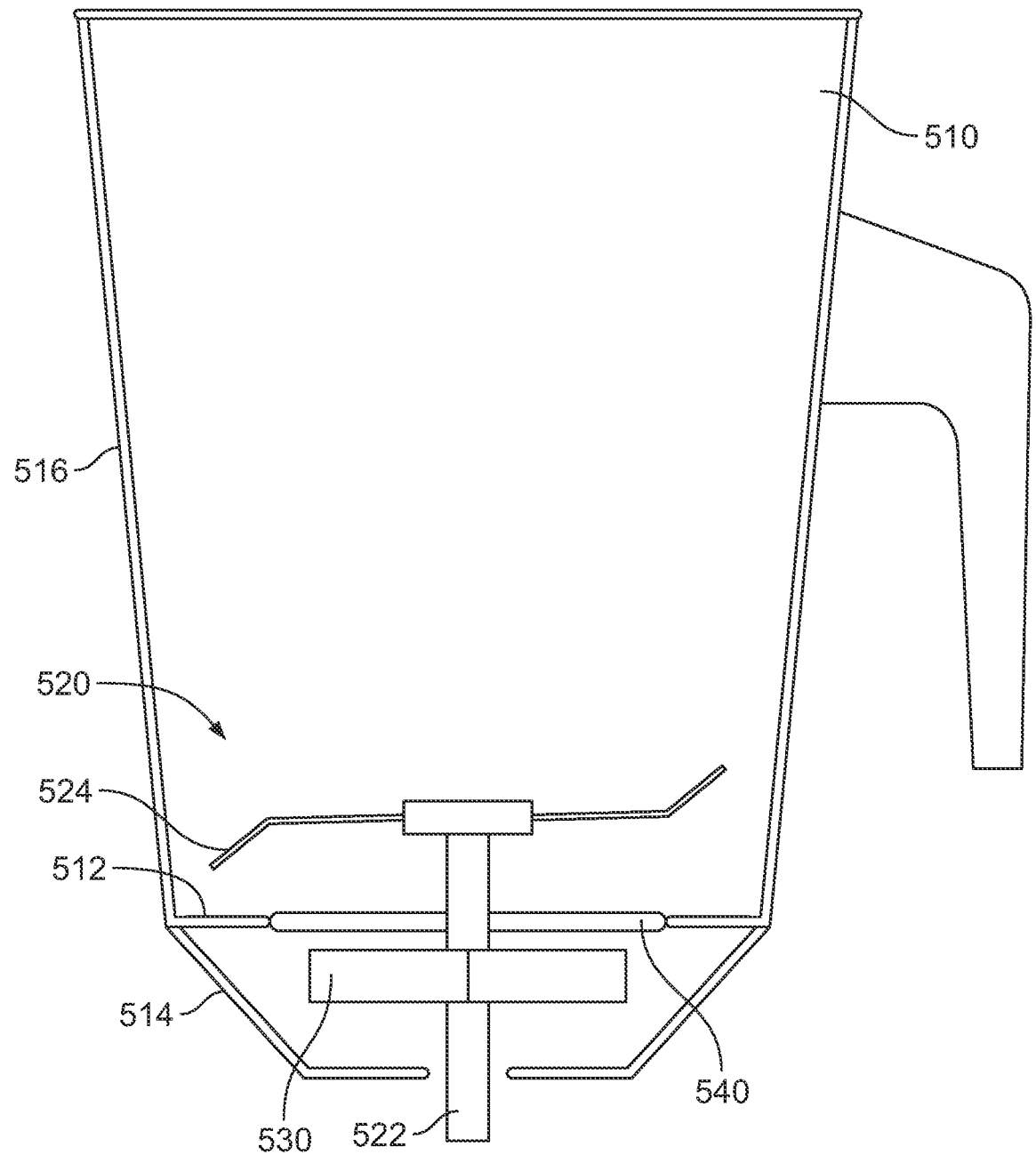
FIG. 5 is a cross-sectional view of a blending system including a magnet and an insert disposed beneath blades of a blade assembly in accordance with various disclosed aspects.

FIG. 5 illustrates a cross-sectional view of a blending container 510 operatively attachable to a blender base (e.g., blender base 250). It is noted that the container 510 may comprise a polymer, metal, or other food-safe material that can withstand steam or heat. For instance, the container 510 may comprise a food-grade plastic such as TRITON. In another aspect, the container 510 may comprise similar aspects as described with reference to the other figures. Moreover, the container 510 may comprise any desired shape.

Container 510 may include sidewalls 516 extending from a bottom 512 and an apron 514 disposed below the bottom 512. A blade assembly 520 may be removably coupled to the container 510. The blade assembly 520 may primarily comprise one or more blades 524, a drive shaft 522, and a splined coupler (not shown). It is noted that the blade assembly 524 may comprise blades for mixing, chopping, frothing, or otherwise processing foodstuff.

A magnet 530 may be attached to the drive shaft 522 under the bottom 512 of the container 510. In some embodiments, the magnet 530 may be operatively disposed within the apron 514 or within a closed chamber. This may prevent the magnet 530 from being exposed to foodstuff within the sidewalls 516. In another aspect, the magnet 530 may be protected from exposure during operation of the blade assembly 520, submerging in liquid, when placed in a dishwasher, or the like. The magnet 530 may be of any appropriate configuration. For example, the magnet 530 may comprise a permanent magnet being neodymium iron boron (NdFeB) magnet, samarium cobalt (SmCo) magnet, alnico magnet, ceramic or ferrite magnet, a temporary magnet, an electromagnet or any combination of the foregoing. In the embodiment shown, the magnet 530 comprises an electromagnet.

An exciter 540 may be positioned at or within the bottom 512 of the container 510. In some embodiments, the exciter 540 may be directly exposed to foodstuff during blending. In other embodiments, the exciter 540 may be hermetically sealed from the foodstuff, such as via overmolding the exciter 540 at or within the bottom 512. At least one example includes the exciter 540 disposed on a bottom surface of the bottom 512. The exciter 540 may comprise a metal material capable of induction. For instance, the exciter 540 may comprise a steel plate. Further, in some embodiments, the exciter 540 may comprise a coil of metal such as a wound solenoid consisting of a number of turns of copper wound around a mandrel. The present teachings are not limited to a defined configuration of an exciter 540. Any appropriate configuration may be utilized.

During operation of the blade assembly 520, the drive shaft 522 rotates the blades 524 and the magnet 530. Rotation of the magnet 530 induces heat with the exciter 540. As the exciter 540 heats, it may transfer heat to the contents within the container 510 via conduction.

In some embodiments, the container 510 may include a clutch that selectively couples the magnet 530 to the drive shaft 522. For instance, the blender base may operatively engage or disengage the clutch to drive the magnet 530 depending on a selected blending program, a sensed temperature (such as through a temperature sensor), or the like. At least one blending program may comprise a series of instructions that include instructions to induce heat in the exciter 540 during a portion of the blending program and to not induce heat in another portion of the blending program.

In at least one other embodiment, a blending container 510 may comprise magnets that are stationary. The magnets may be attached to the blending container, embedded within the container (e.g., overmolded), or the like. These magnets could be attached to the closest point of the side walls relative the blade assembly 520 or could be inserted into a bottom of the container. An exciter may be positioned on a drive shaft 522 of a blade assembly 520. The exciter may be comprised within blades (e.g., such as by way of ferrous material in the blades), attached to the blades, or may be separate from the blades (e.g., positioned above or below the blades).

Figure 6:
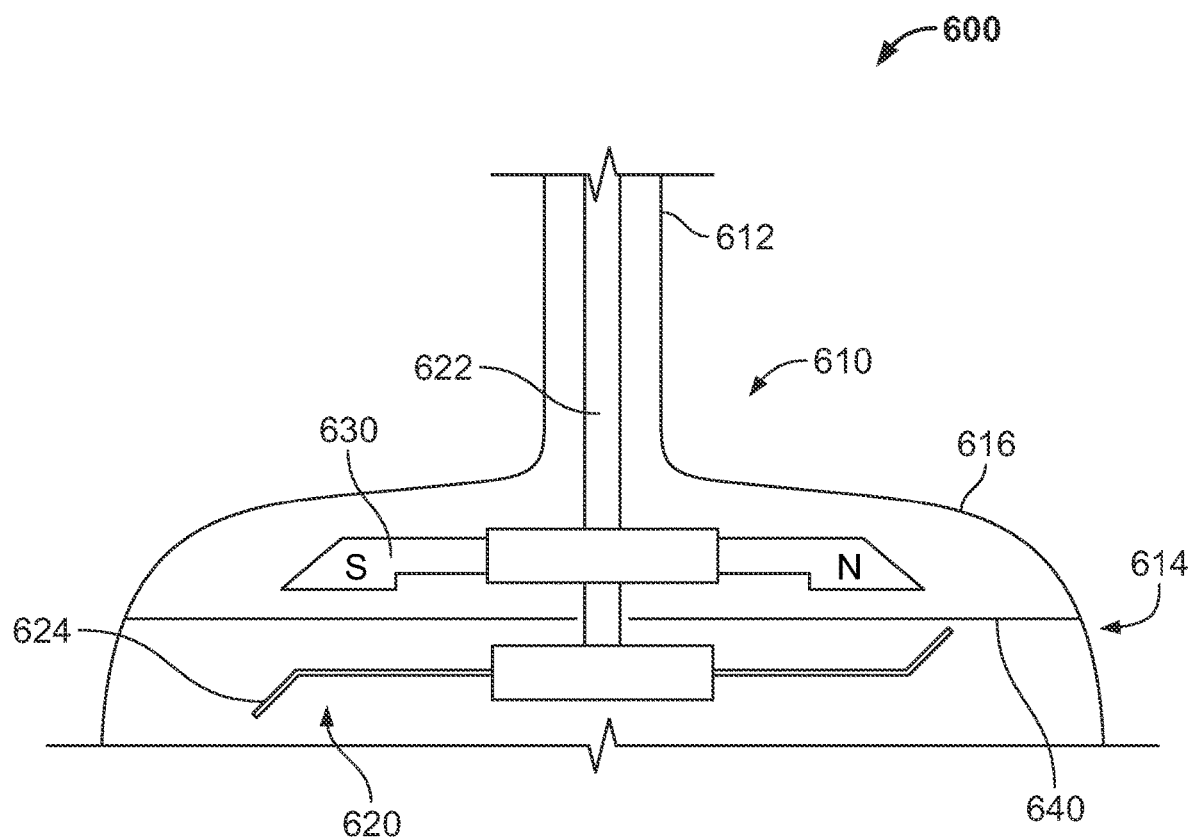
FIG. 6 is a cross-sectional view of a blending system including a magnet and an insert disposed beneath blades of a blade assembly in accordance with various disclosed aspects.

FIG. 6 illustrates a cross-sectional view of a blending system 600 that may be handheld and inserted and directed into foodstuff by a user to effectuate blending, such as an immersion blender. The immersion blender may be of any appropriate configuration and is not limited to that shown in the drawings. The blending system 600 may comprise a housing 610 that may include a shaft 612 and a blending portion 614. The shaft 612 may extend from the blending portion 614 and may include an elongated handle (not shown). The handle may comprise an ergonomically shaped housing, a motor, a power source (e.g., battery, connection to a power outlet, etc.), and other operative components. The motor may drive a drive shaft 622 disposed within the shaft 612. The shaft 612 may protect the drive shaft 622 from damage or exposure to foodstuff, liquids, or debris. The drive shaft 622 may be operatively coupled to a blade assembly 620.

The blending portion 614 may include a blade assembly 620, a magnet 630, an exciter 640, and a shield or body. As described herein, a portion of the housing 610, (e.g., the blending portion 614), may be selectively inserted and directed into foodstuff to effectuate blending of foodstuff by the blade assembly 620. In an embodiment, the blending portion 614 is inserted into a separate container that holds foodstuff.

The blade assembly 620 may be removably coupled to the drive shaft 622. The blade assembly 620 may primarily comprise one or more blades 624 operatively attached to the drive shaft 622, which may be driven by the motor through the drive shaft 622.

The blender portion 614 may include a cup portion 616 that may comprise a generally downwardly turned cup shape. It is noted that the cup portion 616 may include apertures or openings formed therein or other features that may allow for the flow of foodstuff during blending.

The magnet 630 may be attached to the drive shaft 622 and may be disposed between the cup portion 616 and the blade assembly 620 or exciter 640. In some embodiments, the blades 624 may be magnetized; or still further, the magnet 630 may be incorporated into or integrated with the blades 624. In some embodiments, the magnet 630 may be operatively disposed within a closed chamber. For instance, the exciter 640 may enclose the magnet 630 within a chamber defined between the cup portion 616 and the exciter 640. This may prevent the magnet 630 from being exposed to foodstuff during blending. The magnet 630 may be of any appropriate configuration. For example, the magnet 630 may comprise a permanent magnet being neodymium iron boron (NdFeB) magnet, samarium cobalt (SmCo) magnet, alnico magnet, ceramic or ferrite magnet, a temporary magnet, an electromagnet or any combination of the foregoing. In the embodiment shown, the magnet 630 comprises an electromagnet.

The exciter 640 may be positioned at or within the cup portion 616 of the blending portion 614. In some embodiments, the exciter 640 may be directly exposed to foodstuff during blending. In other embodiments, the exciter 640 may be hermetically sealed from the foodstuff, such as via overmolding the exciter 640 at or within the cup portion 616 of the blending portion 614. At least one example includes the exciter 640 attached to or disposed on or within the cup portion 616. The exciter 640 may comprise a metal material capable of induction. For instance, the exciter 640 may comprise a steel plate. Further, in some embodiments, the exciter 640 may comprise a coil of metal such as a wound solenoid consisting of a number of turns of copper wound around a mandrel. The present teachings are not limited to a defined configuration of an exciter 640. Any appropriate configuration may be utilized.

It is noted that the blade assembly 620, magnet 630, and exciter 640 may comprise similar aspects and orientations as described with reference to the other figures.

During operation of the blade assembly 620, the drive shaft 622 rotates the blades 624 and the magnet 630. Rotation of the magnet 630 induces heat with the exciter 640. As the exciter 640 heats, it may transfer heat to the contents within the blending portion 614 or a container (not shown) via conduction.

According to at least some embodiments, a container may comprise an insert similar to what is shown in FIG. 2. The blades 624 and the insert may interact to inductively heat foodstuff within the container. In an example, one of the blades 624 or the insert may be magnetized while the other acts as an exciter for inducing heat. For instance, the blades 624 may be magnetized such that rotation of the blades 624 causes a change to the magnetic flux induced within the insert. In another example, the insert may be magnetized such that rotation of the blades 624 causes magnetic flux and inductive heating. The direction of the current flow is generally perpendicular to the plane in which the magnets are rotating with the magnets rotating concentric to the insert, which may include a metal tube. The magnitude of the current generated may be a function of the rate of change of magnetic flux through the material, the strength of the magnetic field, the thickness of the material, which should be greater than the "skin effect," and the magnetic reluctance of the material.

In such embodiments, the blending system 600 may not include exciter 640 or magnets 630. In this embodiment, the blades may be magnetized thus eliminating the need for additional magnets 630. The magnetized blades 624 may then interact with an inductive material, such as a metal, incorporated in the container itself, thus eliminating the need for an exciter 640 in the blender to induce heat in the system. Moreover, the blending system 600 could be selectively utilized to impart heat within foodstuff according to a particular container selected for blending. For instance, the blending system 600 may be used for a container with an insert for imparting heat, and may be used with a different container without an insert when imparting heat is not desired. Moreover, while an "insert" is described, some or all of a container may comprise a material capable of interacting with the blades 624 to induce heat. In this example, the container itself acts in lieu of a separate exciter 640 to interact with the blades 624 to induce heat in the system 600. As an example, a metal container may be used to induce heat and a plastic container may be used when induction is not desired. Moreover, the insert may be removably inserted into or around a container. In an alternative embodiment, the container may include a magnet 630 while the blender may include an exciter 640 and the rotation of the drive shaft 622 within the blender may induce heat when positioned near the magnet 630 of the container.

Figure 4:
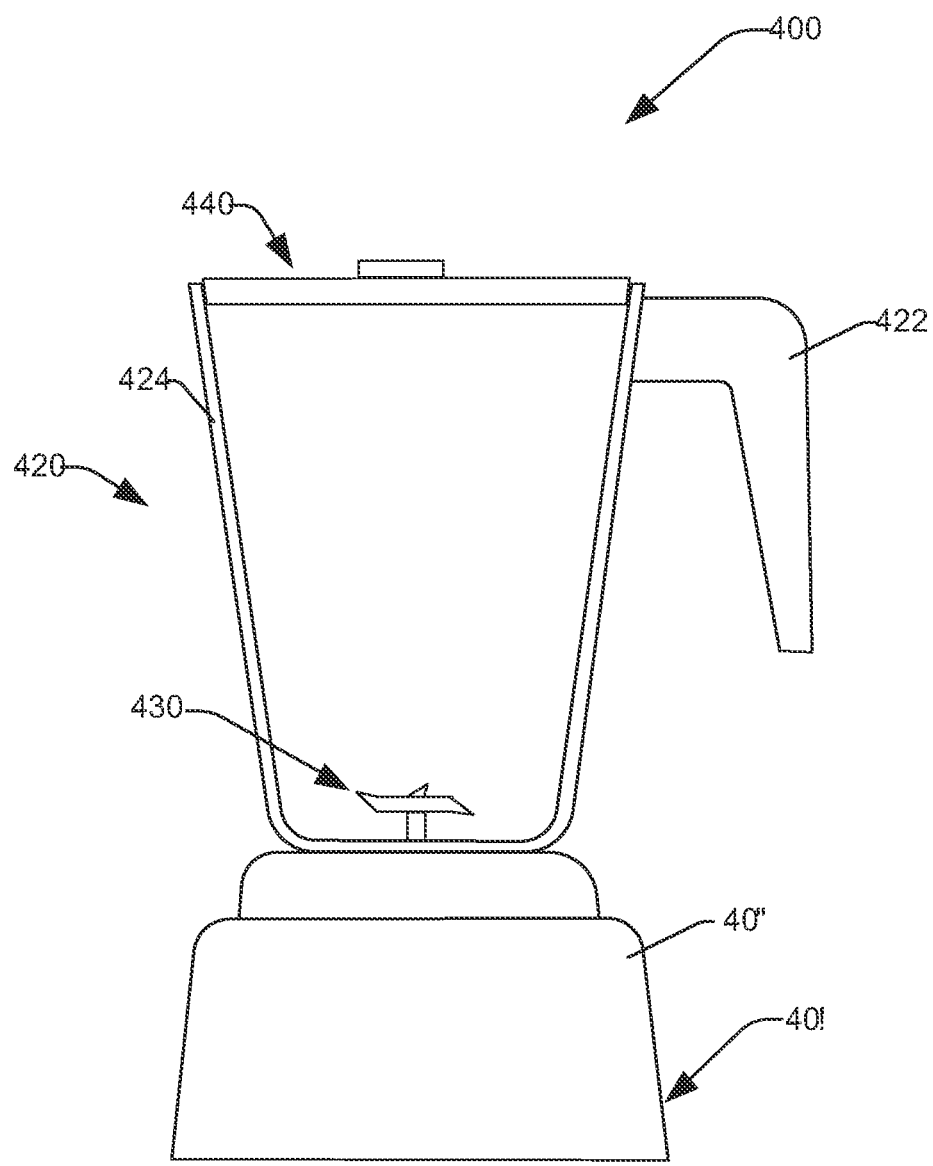
FIG. 4 is a blender device in accordance with various embodiments described herein.

FIG. 4 illustrates an exemplary blending system 400 in accordance with various disclosed embodiments. System 400 may utilize various disclosed aspects. For instance, system 400 may include a large format container, a personal serving sized container, or other blending container as described herein. It is noted that blending system 400 may allow for interchangeable containers.

System 400 primarily includes a blender base 402, a container 420 (or 140) operatively attachable to the blender base 402, a blade assembly 430, and a lid 440 that may be operatively attached to the container. The container 420 may include walls 424 and a handle 422. Foodstuff may be added to the container 420 for blending. It is noted that the container 420 may comprise various materials such as plastics, glass, metals, or the like. In another aspect, container 420 may be powered in any appropriate manner.

The blade assembly 430, container 420, and base 402 may removably or irremovably attach. The container 420 may be powered in any appropriate manner. While shown as a large-format system, system 400 may comprise a single serving style system, where the container is filled, a blender base 402 is attached to the container 420, and then the container is inverted and placed on a base. In another aspect, the container 420 may comprise different sizes and shapes, such as cylindrical or the like.

The base 402 includes a motor disposed within a housing 403. The motor selectively drives the blade assembly 430. The blade assembly 430 may agitate, impart heat, or otherwise interact with contents within the container. Operation of the blender system 400 may impart heat into the contents within container 420, such as through a magnet and an exciter that operatively induce heat through rotation of the magnet relative the exciter, such as described above for the other figures.

In at least one embodiment, the blending system 400 may identify or detect whether the system 400 is interlocked through mechanical detection (e.g., push rods), user input, image recognition, magnetic detection (e.g., reed switches), electronic detection (e.g., inductive coils, a near field communication (NFC) component), or the like.

System 400 and processes described herein generally relate to blending or food-processing systems and include a food-processing disc comprising one or more inductive coils. In another aspect, one or more of the disc(s) and/or lid may comprise an NFC component that may interact with an NFC component of a blender base. The NFC component of the blender base may receive information regarding the type of container and the blender base may utilize the information to determine a blending process to be utilized by the system.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blending system for blending foodstuff, comprising:
   a blender base having a motor;
   a container selectively attachable to the blender base;
   a blade assembly operatively attached to the container, the blade assembly comprising a drive shaft that is operatively driven by the motor to blend the foodstuff; and
   an insert embedded within the container, wherein rotation of the drive shaft operatively induces current within the insert.

2. The blending system of claim 1, wherein the blade assembly further comprises at least one blade, and wherein the blade is magnetized.

3. The blending system of claim 1, wherein the blade assembly further comprises at least one magnet operatively attached to the drive shaft.

4. The blending system of claim 1, further comprising at least one wireless communication device.

5. The blending system of claim 1, wherein the insert is hermetically sealed.

6. The blending system of claim 1, wherein the container further comprises a clutch configured to selectively induce heat in the insert by driving the drive shaft.

7. The blending system of claim 1, further comprising at least one sensor.

8. The blending system of claim 7, wherein the at least one sensor is a temperature sensor.

9. A blending system for blending foodstuff, comprising:
   a blender base having a motor;
   a container selectively attachable to the blender base;
   a blade assembly operatively attached to the container, the blade assembly comprising a drive shaft that is operatively driven by the motor to blend the foodstuff; and
   an insert embedded within the container, wherein rotation of the drive shaft relative to the insert operatively induces heat in the container.

10. The blending system of claim 9, wherein the insert is magnetized.

11. The blending system of claim 9, wherein the blade assembly further comprises at least one blade, and wherein the blade is magnetized.

12. The blending system of claim 9, further comprising at least one wireless communication device.

13. The blending system of claim 9, wherein the insert is hermetically sealed.

14. The blending system of claim 9, further comprising at least one sensor.

15. The blending system of claim 14, wherein the at least one sensor is a temperature sensor.

16. The blending system of claim 9, wherein the container further comprises a clutch configured to selectively induce heat in the insert by driving the drive shaft.

17. A blender container for blending foodstuff, comprising:
   a container body having at least one sidewall defining a cavity;
   a lid operatively attachable to the container body;
   a blade assembly disposed within the cavity, the blade assembly comprising one or more blades and a rotatable drive shaft, wherein the rotatable drive shaft drives the one or more blades to blend the foodstuff contained in the blender container; and
   an insert disposed within the blender container, wherein rotation of the rotatable drive shaft operatively induces current within the insert.

18. The blender container of claim 17, wherein the blade assembly comprises at least one magnetized blade.

19. The blender container of claim 17, wherein the blade assembly further comprises at least one magnet operatively coupled to the drive shaft.

20. The blender container of claim 17, wherein the container further comprises a clutch capable of selectively coupling the insert to the rotatable drive shaft.

21. The blender container of claim 17, wherein at least one blade of the blade assembly is configured to interact with the insert to inductively heat foodstuff within the cavity.

22. The blending system of claim 1, wherein at least one blade of the blade assembly is configured to interact with the insert to inductively heat foodstuff within the container.

* * * * *